United States Patent
Sarkar et al.

(10) Patent No.: US 8,954,063 B2
(45) Date of Patent: *Feb. 10, 2015

(54) BROADCAST AND MULTICAST SERVICES IN WIRELESS COMMUNICATION SYSTEMS

(75) Inventors: Sandip Sarkar, San Diego, CA (US); Aamod Khandekar, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 654 days.

This patent is subject to a terminal disclaimer.

(21) Appl. No.: 13/024,057

(22) Filed: Feb. 9, 2011

(65) Prior Publication Data

US 2012/0120861 A1    May 17, 2012

Related U.S. Application Data

(62) Division of application No. 11/893,834, filed on Aug. 17, 2007, now Pat. No. 8,229,423.

(60) Provisional application No. 60/839,587, filed on Aug. 22, 2006.

(51) Int. Cl.
*H04W 4/20* (2009.01)
*H04H 20/72* (2008.01)
*H04W 72/00* (2009.01)

(52) U.S. Cl.
CPC .................. *H04W 72/005* (2013.01)
USPC ............ 455/434; 370/312; 370/390; 370/432

(58) Field of Classification Search
USPC ................ 455/414.1, 414.2, 414.3, 418, 419, 455/422.1, 435.1, 435.2, 458
See application file for complete search history.

(56) References Cited

U.S. PATENT DOCUMENTS

| | | | |
|---|---|---|---|
| 6,498,936 B1 | 12/2002 | Raith | |
| 7,400,889 B2 | 7/2008 | Balasubramanian et al. | |
| 7,440,425 B2 | 10/2008 | Rajkotia et al. | |
| 7,782,807 B2 | 8/2010 | Yoon et al. | |
| 7,801,103 B2 | 9/2010 | Rhee et al. | |
| 7,912,485 B2 | 3/2011 | Sinnarajah et al. | |
| 8,005,471 B2 * | 8/2011 | Gao | 455/422.1 |
| 8,059,625 B2 | 11/2011 | Cai | |
| 8,229,423 B2 | 7/2012 | Sarkar et al. | |
| 2005/0053023 A1 * | 3/2005 | Rajkotia et al. | 370/312 |

(Continued)

FOREIGN PATENT DOCUMENTS

| | | |
|---|---|---|
| CN | 1701536 A | 11/2005 |
| CN | 1768510 A | 5/2006 |

(Continued)

OTHER PUBLICATIONS

International Search Report—PCT/US07/076573, International Search Authority 0 European Patent Office—Dec. 18, 2007.

(Continued)

*Primary Examiner* — Blane J Jackson
(74) *Attorney, Agent, or Firm* — Howard Seo (57) ABSTRACT

Methods and apparatus for assigning, identifying and controlling broadcast transmissions are disclosed. A broadcast flow is assigned to a broadcast logical channel of the physical resources of a wireless communication channel. A broadcast channel control message indicative of parameters of the broadcast logical channel is generated. Upon receipt, the broadcast channel control message is processed and used to accordingly process the received broadcast transmission.

10 Claims, 5 Drawing Sheets

(56) References Cited

U.S. PATENT DOCUMENTS

| | | |
|---|---|---|
| 2005/0073990 A1 | 4/2005 | Chang et al. |
| 2005/0078676 A1 | 4/2005 | Bae et al. |
| 2005/0186973 A1 | 8/2005 | Gaal et al. |
| 2007/0058628 A1 | 3/2007 | Palnati et al. |
| 2007/0173194 A1 | 7/2007 | Vare et al. |
| 2008/0025241 A1 | 1/2008 | Bhushan et al. |
| 2008/0026715 A1 | 1/2008 | Gao |

FOREIGN PATENT DOCUMENTS

| | | |
|---|---|---|
| JP | 2003143027 A | 5/2003 |
| JP | 2005086818 A | 3/2005 |
| JP | 2005323378 A | 11/2005 |
| JP | 2006518969 A | 8/2006 |
| JP | 2007515882 A | 6/2007 |
| WO | 2005027566 | 3/2005 |
| WO | WO2005055473 A1 | 6/2005 |
| WO | 2005079086 A2 | 8/2005 |

OTHER PUBLICATIONS

Written Opinion—PCT/US07/076573, International Search Authority—European Patent Office—Dec. 18, 2007.

Taiwan Search Report—TW096131111—TIPO—Feb. 11, 2012.

* cited by examiner

BROADCAST AND MULTICAST SERVICES IN WIRELESS COMMUNICATION SYSTEMS

CROSS OF PRIORITY UNDER 35 U.S.C. §120

The present Application for Patent is a divisional claims priority of patent application Ser. No. 11/893.834, entitled BROADCAST AND MULTICAST SERVICES IN WIRELESS COMMUNICATION SYSTEMS, filed Aug. 17, 2007, and U.S. Provisional Application No. 60/839,587, filed Aug. 22, 2006, assigned to the assignee hereof and hereby expressly incorporated by reference herein.

BACKGROUND

1. Field

The present disclosure relates generally to wireless communication, and amongst other things, to broadcast and multicast services in wireless communication systems.

2. Background

Wireless communication systems have become a prevalent means by which a majority of people worldwide have come to communicate. Wireless communication devices have become smaller and more powerful in order to meet consumer needs and to improve portability and convenience. The increase in processing power in mobile devices, such as cellular telephones, has lead to an increase in demands on wireless network transmission systems. Such systems typically are not as easily updated as the cellular devices that communicate there over. As mobile device capabilities expand, it can be difficult to maintain an older wireless network system in a manner that facilitates fully exploiting new and improved wireless device capabilities.

Wireless communication systems generally utilize different approaches to generate transmission resources in the form of channels. These systems may be code division multiplexing (CDM) systems, frequency division multiplexing (FDM) systems, and time division multiplexing (TDM) systems. One commonly utilized variant of FDM is orthogonal frequency division multiplexing (OFDM) that effectively partitions the overall system bandwidth into multiple orthogonal subcarriers. These subcarriers may also be referred to as tones, bins, and frequency channels. Each subcarrier can be modulated with data. With time division based techniques, each subcarrier can comprise a portion of sequential time slices or time slots. Each user may be provided with a one or more time slot and subcarrier combinations for transmitting and receiving information in a defined burst period or frame. The hopping schemes may generally be a symbol rate hopping scheme or a block hopping scheme.

Code division based techniques typically transmit data over a number of frequencies available at any time in a range. In general, data is digitized and spread over available bandwidth, wherein multiple users can be overlaid on the channel and respective users can be assigned a unique sequence code. Users can transmit in the same wideband portion of spectrum, wherein each user's signal is spread over the entire bandwidth by its respective unique spreading code. This technique can provide for sharing, wherein one or more users can concurrently transmit and receive. Such sharing can be achieved through spread spectrum digital modulation, wherein a user's stream of bits is encoded and spread across a very wide channel in a pseudo-random fashion. The receiver is designed to recognize the associated unique sequence code and undo the randomization in order to collect the bits for a particular user in a coherent manner.

A typical wireless communication network (e.g., employing frequency, time, and/or code division techniques) includes one or more base stations that provide a coverage area and one or more mobile (e.g., wireless) terminals that can transmit and receive data within the coverage area. A typical base station can simultaneously transmit multiple data streams for broadcast, multicast, and/or unicast services, wherein a data stream is a stream of data that can be of independent reception interest to a mobile terminal. A mobile terminal within the coverage area of that base station can be interested in receiving one, more than one or all the data streams transmitted from the base station. Likewise, a mobile terminal can transmit data to the base station or another mobile terminal. In these systems the bandwidth and other system resources are assigned utilizing a scheduler.

SUMMARY

Techniques for assigning, identifying and controlling broadcast transmissions are disclosed. A broadcast flow is assigned to a broadcast logical channel of physical resources of a wireless communication channel. A broadcast channel control message indicative of parameters of the broadcast logical channel is generated. Upon receipt, the broadcast channel control message is processed and used to process the received broadcast transmission. Apparatus for carrying out the same are also disclosed.

In one embodiment, a wireless communication device includes a memory and a processor coupled with the memory. The processor is configured to generate a broadcast channel control message indicative of parameters of broadcast transmissions in a wireless communication system. In another embodiment, a wireless communication device includes a memory and a processor coupled with the memory. The processor is configured to assign at least one broadcast flow to a plurality of physical resources of a wireless communication channel.

In other embodiments, a method includes assigning at least one broadcast flow to a plurality of physical resources of a wireless communication channel. At least one error correction code is then assigned to the broadcast flow. In another embodiment, a method includes allocating at least one broadcast flow to a broadcast logical channel. A broadcast channel control message is then generated. The broadcast channel control message is indicative of parameters of a broadcast logical channel.

In yet another embodiment, a method for processing a broadcast transmission is disclosed. A broadcast channel control message is processed for being received by a wireless communication device. The broadcast channel control message is indicative of parameters of transmission parameters of a broadcast transmission to be received by the wireless communication device. The wireless communication device processes the broadcast transmission according to the parameters.

In yet a further embodiment, a wireless communication device includes a memory and a processor coupled with the memory. The processor is configured to process a broadcast channel control message indicative of parameters of transmission parameters of at least one broadcast transmission to be received by the wireless communication device.

Various aspects and embodiments of the invention are described in further detail below.

DETAILED DESCRIPTION

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

Figure 1:
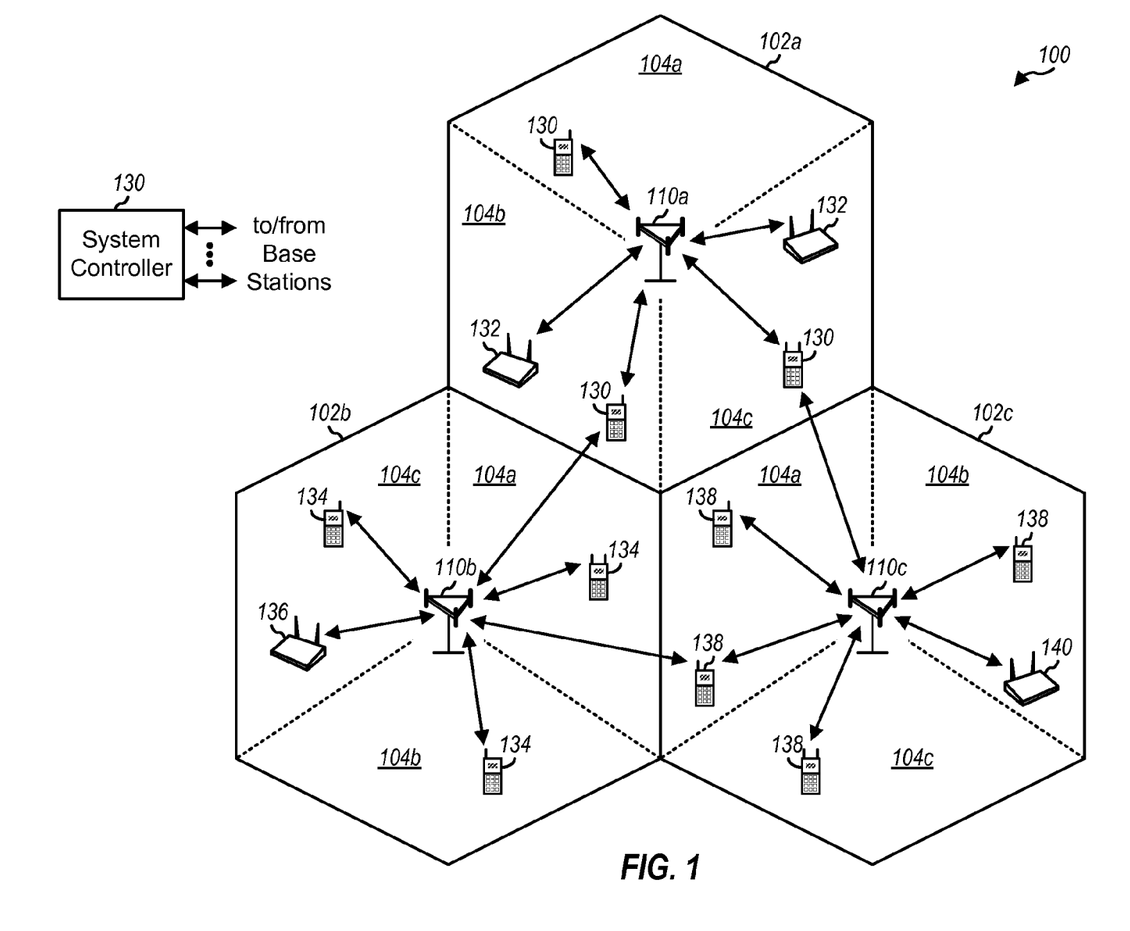
FIG. 1 illustrates a configuration of a multiple access wireless communication system, in accordance with various embodiments of the present invention.

Referring to FIG. 1, a multiple access wireless communication system according to one embodiment is illustrated. A multiple access wireless communication system 100 includes multiple cells (e.g., cells 102a, 102b, and 102c). In the embodiment of FIG. 1, each cell 102a, 102b, and 102c may include an access point 110 that includes multiple sectors. The multiple sectors are formed by groups of antennas each responsible for communication with access terminals in a portion of the cell. In cell 102a, antenna groups each correspond to different sectors 104a, 104b, and 104c. In cell 102b, antenna groups each correspond to different sectors 104a, 104b, and 104c. In cell 102c, antenna groups each correspond to different sectors 104a, 104b, and 104c.

Each cell includes several access terminals which are in communication with one or more sectors of each access point. For example, access terminals 130 and 132 are in communication access point 110a, access terminals 134 and 136 are in communication with access point 110b, and access terminals 138 and 140 are in communication with access point 110c.

Controller 130 is coupled to each of the cells 102a, 102b, and 102c. Controller 130 may contain one or more connections to multiple networks (e.g., the Internet, other packet based networks, or circuit switched voice networks) that provide information to, and from, the access terminals in communication with the cells of the multiple access wireless communication system 100. The controller 130 includes, or is coupled with, a scheduler (not separately shown) that schedules transmission from and to access terminals. In other embodiments, the scheduler may reside in each individual cell, each sector of a cell, or a combination thereof.

In one embodiment, part of the bandwidth in each, or a subset of frames or superframes, may be reserved for broadcast and multicast (BCMCS) operation. In another embodiment, this may be a single frequency or other resource overlap between one or more adjacent, or non-adjacent sectors.

In such embodiments where the wireless communication system communicates according to an interlaced structure (e.g., where there is time division of frames, or groups of frames for a transmission or set of transmissions), at least one sub-band (e.g., group of subcarriers) on each interlace is not assigned for BCMCS transmission. Further, control signaling on the reverse link may be provided to support BCMCS transmission (e.g. separate CQI, ACK, and/or other feedback may be provided for the BCMCS transmission).

By way of example, each broadcast transmission may be identified by a broadcast flow ID. Further, a broadcast transmission may include a television transmission (e.g. information that is associated with a television channel or may be other information such as stock quotes or a timetable, or other information). In another example, a collection of flows may be aggregated into a BCMCS logical channel (BLC). The BLC may be assigned to one or more broadcast physical channels (BPC) that are physical layer resources (e.g., tones, OFDM symbols, time-frequency allocations, or combinations thereof).

According to one or more embodiments, a BLC may be characterized by one or more parameters. In one example, the parameters may be a scrambling sequence, packet transmission format, including modulation hierarchy, and outer-code parameters, as discussed later herein. In another example, different BLCs are mapped to disjoint sets of BPCs to reduce interference, and utilize a modulation hierarchy that is maintained for some period (e.g., the length of the data flow). Further, BPCs with the same BLCs may use the same physical layer (PL) transmission format.

In an embodiment where a single frequency network (SFN) is used for broadcast transmissions, there may be multiple SFN zones per BLC and, or, many BLCs can map to one SFN. Where multiple sectors provide a single BLC, the sectors may transmit the BLC using same BPCs and scrambling for same SFN zone.

As used herein, an access point may be a fixed station used for communicating with the terminals and may also be referred to as, and include some or all the functionality of, a base station, a Node B, or some other terminology. An access terminal may also be referred to as, and include some or all the functionality of, a user equipment (UE), a wireless communication device, terminal, a mobile station or some other terminology.

It is noted that while FIG. 1 depicts physical sectors (i.e., having different antenna groups for different sectors), other approaches may be utilized. For example, utilizing multiple fixed "beams" that each cover different areas of the cell in frequency space may be utilized in lieu of, or in combination with physical sectors.

Figure 2A:
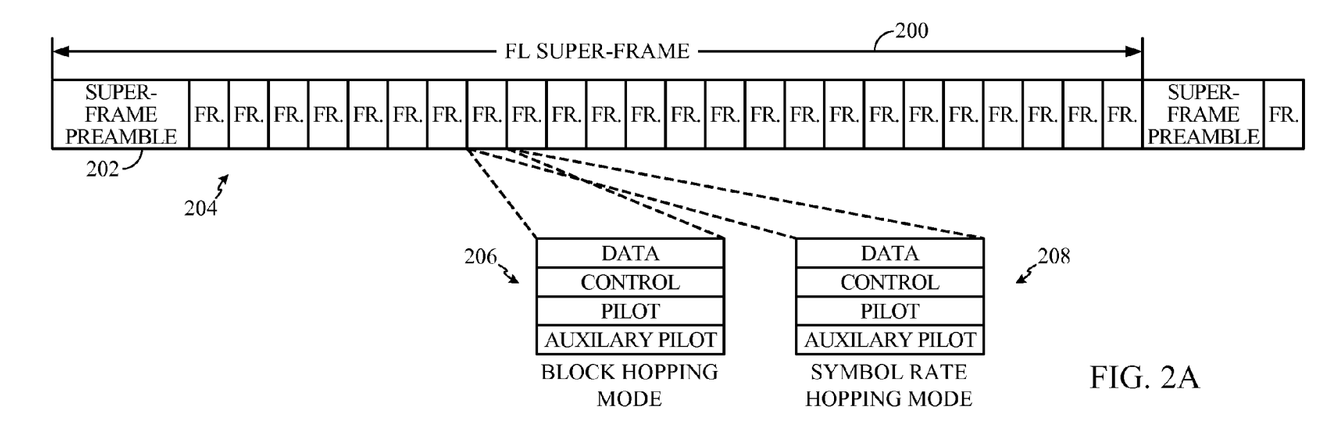
FIGS. 2A and 2B illustrate super-frame structures for a multiple access wireless communication system, in accordance with one or more embodiments the present invention.
Figure 2B:
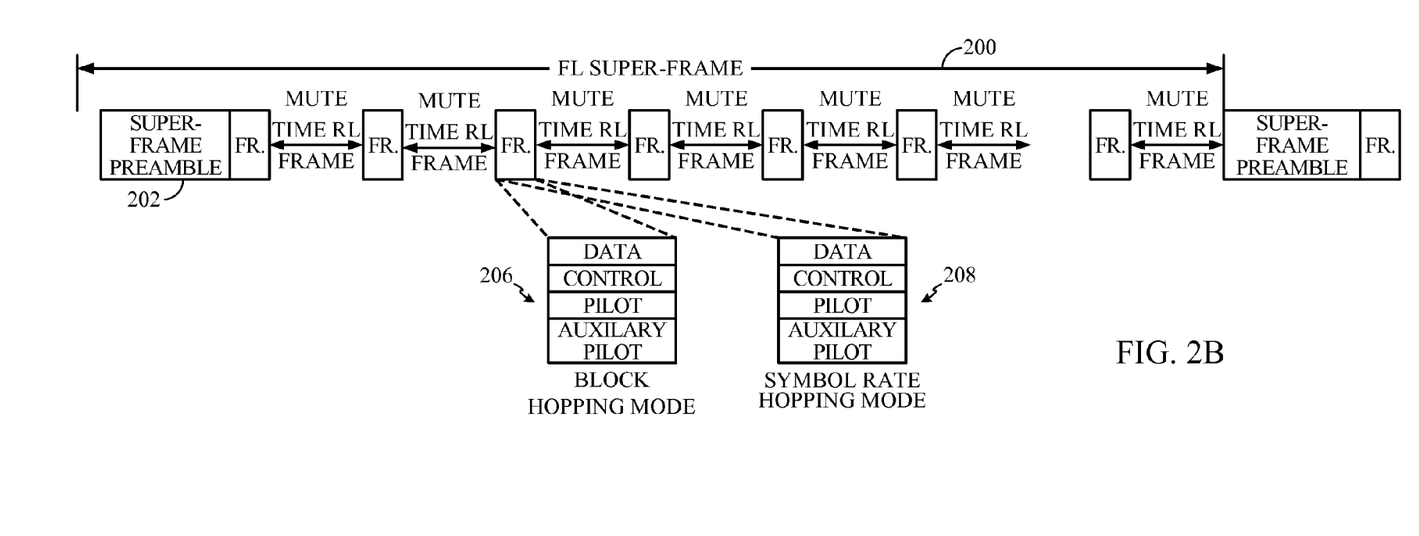

Referring to FIGS. 2A and 2B, embodiments of super-frame structures for a multiple access wireless communication system are illustrated. FIG. 2A illustrates an embodiment of a super-frame structure for a frequency division duplexed (FDD) multiple access wireless communication system, while FIG. 2B illustrates an embodiment of a super-frame structure for a time division duplexed (TDD) multiple access wireless communication system. In the various embodiments, the super-frame preamble may span one carrier and may hop for each super-frame, a multiple number of super-frames, a fixed time duration, or the like, as discussed above. The hop sequence or pattern may be determined based upon the access point identification (e.g., a pseudo-noise (PN) sequence), from which an access terminal may determine the hop pattern or sequence for the superframe. Then based upon the hop pattern or sequence and the carrier associated with the super-frame preamble in the last super-frame, the carrier to be associated with the superframe preamble in the next super-frame may be determined.

In both FIGS. 2A and 2B, the forward link transmission is divided into units of super-frames. A super-frame 200 may consist of a super-frame preamble 202 followed by a series of frames 204. In an FDD system, the reverse link and the forward link transmission may occupy different frequency bandwidths so that transmissions on the links do not, or for the most part do not, overlap on any frequency subcarriers. In a TDD system, N forward link frames and M reverse link frames define the number of sequential forward link and reverse link frames that may be continuously transmitted prior to allowing transmission of the opposite type of frame. It is noted that the number of N and M may be vary within a given super-frame or between super-frames.

In both FDD and TDD systems, each super-frame may comprise a super-frame preamble 202. In certain embodiments, the super-frame preamble 202 includes (i) a pilot channel that includes pilots that may be used for channel estimation by access terminals, and (ii) a broadcast channel that includes configuration information that the access terminal may utilize to demodulate the information contained in the forward link frame. Further acquisition information, such as timing and other information sufficient for an access terminal to communicate on one of the carriers and basic power control or offset information, may also be included in the super-frame preamble 202. In other cases, only some of the above and/or other information may be included in this super-frame preamble 202.

In one embodiment, the following information may be included in the super-frame preamble 202: (i) a common pilot channel; (ii) a broadcast channel; (iii) an acquisition pilot channel; and (iv) another sector interference channel. A super-frame preamble 202, or one or more frames 204, may include a broadcast overhead channel (BOC). In one example, there may be up to 4 BOCs per sector. In another example, all of the BLC information may be contained in one BOC and may include the allocated BPCs.

As shown in FIGS. 2A and 2B, the super-frame preamble 202 is followed by a sequence of frames 204. Each frame 204 may consist of a same or a different number of OFDM symbols, which may constitute a number of subcarriers that may be simultaneously utilized for transmission over some defined period. Further, each frame may operate according to a symbol rate hopping mode 206, where one or more non-contiguous OFDM symbols are assigned to a user on a forward link or reverse link, or a block hopping mode 208, where users hop within a block of OFDM symbols. The actual blocks or OFDM symbols may or may not hop between frames.

Figure 3:
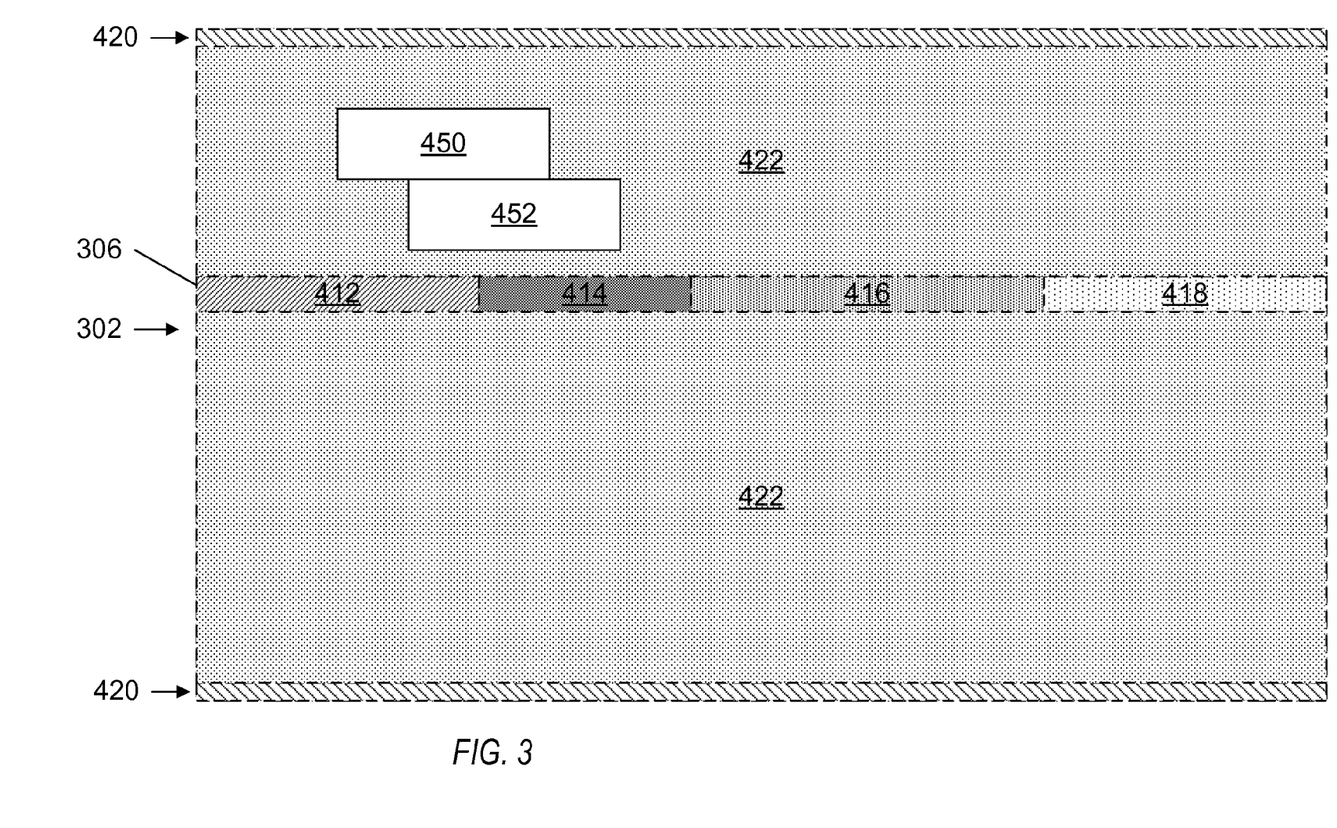
FIG. 3 illustrates a forward link frame structure, according to one or more embodiments of the present invention.

Referring to FIG. 3, embodiments of a forward link frame are illustrated. As shown in FIG. 3, each forward link frame 302 is further divided into three segments. The first, a control channel 306, which may or may not comprise a contiguous group of subcarriers or OFDM symbols, has a variable number of subcarriers assigned depending on the desired amount of control data and other considerations. Each of the control channels 306 may include information for functions related to, for example, acquisition; acknowledgements; forward link assignments for each access terminal, which may be different or the same for broadcast, multicast, and unicast message types, reverse link assignments for each access terminal; reverse link power control for each access terminal; and reverse link acknowledgements. It is noted that more or fewer of such functions may be supported in control channels 306 of one or all of the carriers. Also, the control channels 306 may hop in each frame according to hopping sequences that are the same or different from hopping sequences assigned to data channels.

The remaining portions 422 are generally available for data transmission, except those reserved for BCMCS (e.g., time-frequency allocations such as BPCs 450 and 452). Control channel 306 may include one or more pilot channels 412 and 414. In symbol rate hopping mode, the pilot channels may be present on all of the OFDM symbols in each forward link frame, and need not be included in the control channel 306 in those instances. In both cases, a signaling channel 416 and a power control channel 418 may be present in the control channel, 306, as depicted in FIG. 3. The signaling channel 416 may include assignment, acknowledgement, and/or power references and adjustments for data, control, and pilot transmissions on the reverse link.

Power control channel 418 may carry information regarding interference generated at other sectors due to transmissions from access terminals of that sector. Also by way of example, the subcarriers 420 at the edge of each carrier of the forward link frame 302, but often not at the edge of the entire bandwidth, may function as quasi-guard subcarriers.

In another embodiment, control channel 306 may include a broadcast control channel (PBCCH), which may include a new message BroadcastChannelInfo, however, any other name for the message may be utilized. The PBCCH may include one or more of the following: BLC transmission format, Error Control Block (ECB) parameters (e.g., the periodicity of BPC), pilot information, scrambling sequence, flows mapped to the BLCs, partitioning PL resources into BPCs, BPCs occupied by various BOCs, and the mapping of BLCs to corresponding BOCs. The message may also include information pointing to the location of the BOC.

In order to improve efficiency in one or more embodiments, each of the parameters may have an expiry timer, after which an access terminal may need to reacquire the parameters. This may be provided so that the access terminal need not continuously monitor the message, while being sent often enough for reasonable initial acquisition.

In one embodiment, the BOC may be a special case of the BLC. The BOC may provide time diversity for reliable decoding. Further, the BOC may be repeated every outer frame (OF) and may be transmitted every ultra-frame (UF). The BOC is valid for next UF or until contents are updated. In other embodiments, the BLC configuration can be updated every N UFs, where N: Period of BOC associated with BLC.

In one embodiment, an UF may be forty-eight PL super-frames, although other numeraligies may also be utilized. When the UF is forty-eight PL super-frames, the duration is approximately 1.1 seconds allowing for an average switching time between channels of approximately 1.7 seconds.

In one embodiment, the 15 may be divided into N Outer Frames (OF), where N=1, 2, 4, 8, etc. Each UF may be used to logically multiplex channels. In certain embodiments, the broadcast instantaneous source rates of individual channels may vary with time. Accordingly, the use of UFs allows the aggregate payload from all channels to remain approximately constant.

As discussed above, the BLCs carry variable bit rate (VBR) traffic (e.g., the flows vary with time). Furthermore, in some system implementations, the BLCs are designed to provide some averaging based on different conditions. Thus, statistical multiplexing may be utilized in assigning the BLCs and in assigning the BLCs to the BPCs to improve bandwidth allocation.

Furthermore in other embodiments, the data rate on each BLC may significantly change with time. Thus, the resource allocation across different BLCs is adjusted every BOC which may be provided by in-band signaling, for example, in the BLC. Furthermore, the BLC location in the next UF may be provided by in-band signaling which may have the benefit of reducing wake-up time of the terminal and thus increase access terminal battery life.

In one embodiment, BPCs 450 and 452 may be contiguous in frequency with a first frequency incrementing into a second frequency and so forth. This resource allocation may provide reduced access terminal wake-up time, thus increasing battery life. Further, there may be an upper limit to the incrementing (e.g., up to 5 MHz), which in turn may limit the buffering requirements at the access terminal.

It is noted that where multiple transmit antennas may be used to transmit for a sector, the different transmit antennas may have the same super-frame timing (including the super-frame index), OFDM symbol characteristics, and hop sequences. It is noted that, in some embodiments, the control channel 306 may comprise the same allocations as a data transmission (e.g. if data transmissions are block hopped then blocks of the same or different sizes may be allocated for the control channel).

While the discussion with respect to FIGS. 2A, 2B, and 3 include information regarding a super-frame preamble, a super-frame preamble need not be utilized. An alternative approach may include utilizing frames with preambles that have equivalent information. Also, a broadcast control channel may be utilized to contain some or all of the information of the super-frame preamble, with other information contained in a preamble or control channel of a frame.

Furthermore, other frame parameters and coding and modulation formats that may be supported are also contemplated herein. It is noted that other frame parameters, and coding and modulation formats may be utilized with one or more of the schemes and channel structures described herein.

Figure 4:
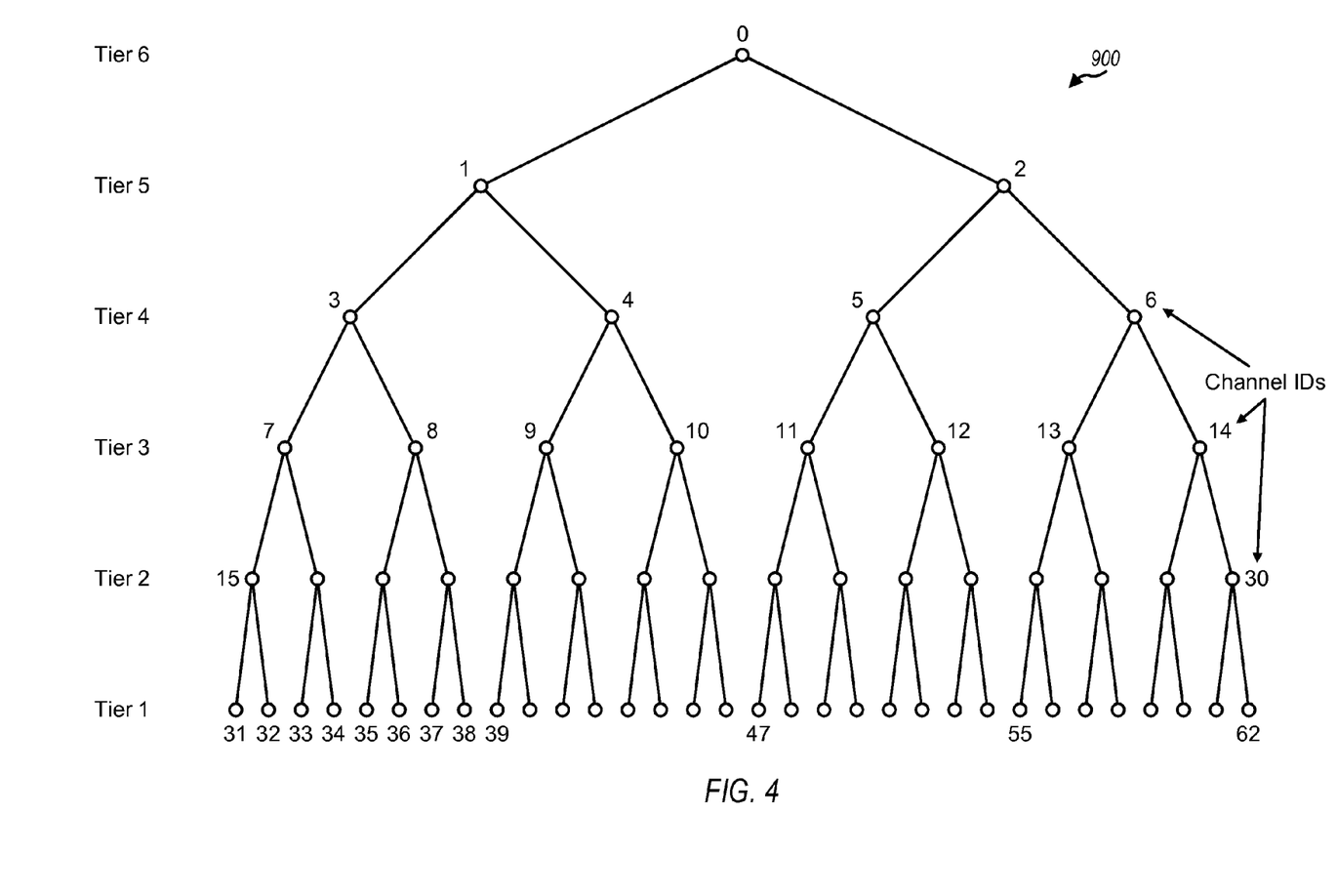
FIG. 4 illustrates a channel tree, in accordance with one or more embodiments of the present invention.

FIG. 4 shows a binary channel tree 900, in accordance with an embodiment. For the embodiment shown in FIG. 4, a quantity of subcarrier sets, S, wherein S=32, is available for use. The subcarrier sets, in one embodiment, may comprise at least two groups of subcarriers. In another embodiment, the groups of subcarriers may be disjoint from each other, while the subcarriers in each group are contiguous with each other. In such a way resources may be efficiently provided while providing some diversity for each assignment.

A set of traffic channels may be defined with, for example, thirty-two subcarrier sets. Each traffic channel is assigned a unique channel ID and is mapped to one or more subcarrier sets in each time interval. For example, a traffic channel may be defined for each node in channel tree 900. By way of example, the traffic channels may be sequentially numbered from top to bottom and from left to right for each tier. The largest traffic channel corresponding to the topmost node is assigned a channel ID of 0 and is mapped to all thirty-two subcarrier sets. The thirty-two traffic channels in the lowest tier 1 have channel IDs of 31 through 62 and are called base traffic channels. Each base traffic channel is mapped to one subcarrier set.

The tree structure shown in FIG. 4, places certain restrictions on the use of the traffic channels for an orthogonal system. For each traffic channel that is assigned, all traffic channels that are subsets (or descendants) of the assigned traffic channel and all traffic channels for which the assigned traffic channel is a subset are restricted. The restricted traffic channels are not used concurrently with the assigned traffic channel so that no two traffic channels use the same subcarrier set at the same time.

In one embodiment, one or more nodes of the tree, depending on the utilization may be assigned for BCMCS transmission. In one scenario, no node below a node assigned for BPC may be assigned for non-BPC channels (e.g., data or control). In another scenario, BPCs may be assigned consecutive base nodes in order to simplify channel assignment.

As previously discussed, PL packets of a BLC may be protected by an outer code. That is, a block of BLC data can have an outer code. By way of example, this may be an error control block code (ECB). The ECB may be a matrix of R rows and C columns (R=1, 16 or 32), with the row width determined by sequence of PL packets transmitted on ECB. The values of R and C may be signaled on the BLC (e.g., in the BroadcastChannelInfo field).

In another example, the error correction code may be an outer code that may have a span (S UFs) of BLC with BOC period N. In some examples, S may be a multiple of N. The ECB of a BLC may be a sequence of S consecutive UFs, from UF t, where t mod S=0. In these examples, if N|S, parameters of the traffic BOC change on ECB boundaries. By way of example, the sequence of BPC packets (or erasures) on BLC over S UFs may be written row-wise into a matrix of R rows and C columns. In order to facilitate error correction, missing entries may be filled with all-zero packets. There may be a need, although this is not required, to buffer all UF hard decisions if outer code error correction is used.

By way of example, each sub-matrix of R rows by k columns that is a received codeword of (R, k) may be a Reed-Solomon code. The time span of each BLC may vary or may be fixed. Further, a minimum switching time for BLC is proportional to the span of ECB (S UFs). Generally, the smaller value of S, the quicker the switching time. However, a longer value of S increases the Reed-Solomon code that increases the diversity.

Further, the data rate of the BLC over longer time spans is the average rate. The BLC may be fixed for longer times for improving the overhead. In one example, nonstreaming applications may have a longer ECB compared to streaming applications.

Figure 5:
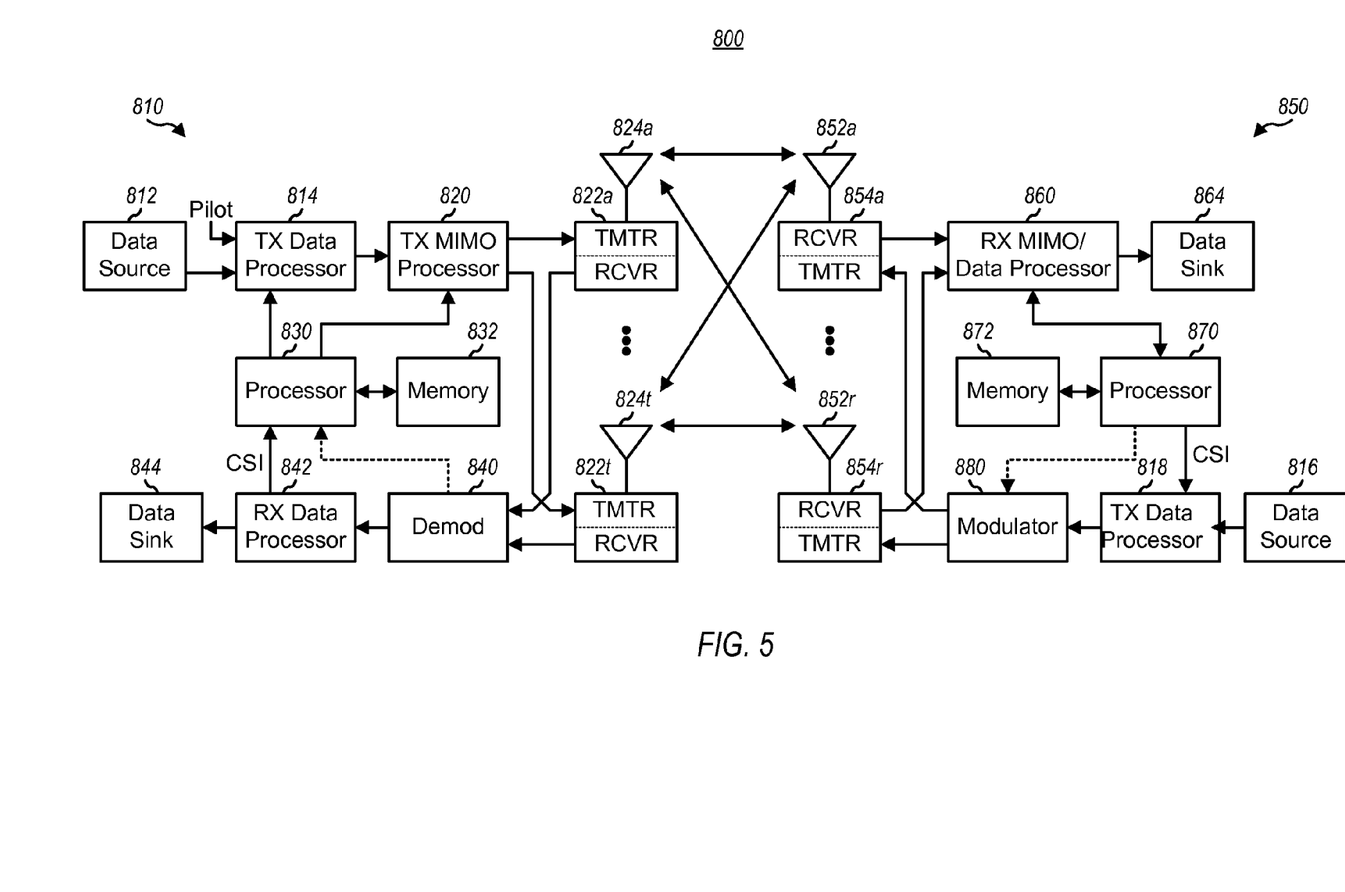
FIG. 5 illustrates a transmitter and receiver in a multiple access wireless communication system, in accordance with one or more embodiments of the present invention.

Referring to FIG. 5, a block diagram of an embodiment of a transmitter system 810 and a receiver system 850 in a MIMO system 800 is illustrated. At transmitter system 810, traffic data for a number of data streams is provided from a data source 812 to transmit (TX) data processor 814. In one embodiment, each data stream is transmitted over a respective transmit antenna. The TX data processor 814 formats, codes, and interleaves the traffic data for each data stream to provide coded data based on a particular coding scheme selected for that data stream.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or MQAM) selected for that data stream to provide modulation symbols. The data rate, coding, and modulation for each data stream may be determined by instructions performed by processor 830.

The modulation symbols for all data streams are then provided to a TX processor 820, which may further process the modulation symbols (e.g., for OFDM). The TX processor 820 then provides $N_T$ modulation symbol streams to $N_T$ transmitters (TMTR) 822a through 822t. Each transmitter 822 receives and processes a respective symbol stream to provide one or more analog signals, and further conditions (e.g., amplifies, filters, and upconverts) the analog signals to provide a modulated signal suitable for transmission over the MIMO channel. The $N_T$ modulated signals from transmitters 822a through 822t are then transmitted from $N_T$ antennas 824a through 824t, respectively.

At receiver system 850, the transmitted modulated signals are received by $N_R$ antennas 852a through 852r and the received signal from each antenna 852 is provided to a respective receiver (RCVR) 854. Each receiver 854 conditions (e.g., filters, amplifies, and downconverts) a respective received signal, digitizes the conditioned signal to provide samples, and further processes the samples to provide a corresponding "received" symbol stream.

An RX data processor 860 then receives and processes the $N_R$ received symbol streams from $N_R$ receivers 854 based on a particular receiver processing technique to provide $N_T$ "detected" symbol streams. The processing by RX data processor 860 is described in further detail below. Each detected symbol stream includes symbols that are estimates of the modulation symbols transmitted for the corresponding data stream. RX data processor 860 then demodulates, deinterleaves, and decodes each detected symbol stream to recover the traffic data for the data stream. The processing by RX data processor 818 is complementary to that performed by TX processor 820 and TX data processor 814 at transmitter system 810.

The channel response estimate generated by RX processor 860 may be used to perform space, space/time processing at the receiver, adjust power levels, change modulation rates or schemes, or other actions. The RX processor 860 may further estimate the signal-to-noise-and-interference ratios (SNRs) of the detected symbol streams, and possibly other channel characteristics, and provides these quantities to a processor 870. The RX data processor 860 or processor 870 may further derive an estimate of the "operating" SNR for the system. Processor 870 then provides channel state information (CSI), which may comprise various types of information regarding the communication link and/or the received data stream. For example, the CSI may comprise only the operating SNR. The CSI is then processed by a TX data processor 878, modulated by a modulator 880, conditioned by transmitters 854a through 854r, and transmitted back to transmitter system 810.

At transmitter system 810, the modulated signals from receiver system 850 are received by antennas 824, conditioned by receivers 822, demodulated by a demodulator 840, and processed by a RX data processor 842 to recover the CSI reported by the receiver system. The reported CSI is then provided to processor 830 and used to (i) determine the data rates and coding and modulation schemes to be used for the data streams, and (ii) generate various controls for TX data processor 814 and TX processor 820. Alternatively, the CSI may be utilized by processor 870 to determine modulation schemes and/or coding rates for transmission, along with other information. This may then be provided to the transmitter which uses this information, which may be quantized, to provide later transmissions to the receiver.

Processors 830 and 870 direct the operation at the transmitter and receiver systems, respectively. Memories 832 and 872 provide storage for program codes and data used by processors 830 and 870, respectively.

At the receiver, various processing techniques may be used to process the $N_R$ received signals to detect the $N_T$ transmitted symbol streams. These receiver processing techniques may be grouped into two primary categories (i) spatial and space-time receiver processing techniques (which are also referred to as equalization techniques); and (ii) "successive nulling/equalization and interference cancellation" receiver processing technique (which is also referred to as "successive interference cancellation" or "successive cancellation" receiver processing technique).

While FIG. 5 discloses a MIMO system, the same system may be applied to a multiinput single-output system where multiple transmit antennas (e.g., those on a base station), transmit one or more symbol streams to a single antenna device (e.g., a mobile station). Also, a single output to single input antenna system may be utilized in the same manner as described with respect to FIG. 5.

As used herein, the terms broadcast and multicast may be applied to the same transmission. That is, a broadcast need not be sent to all terminals of an access point or sector.

The transmission techniques described herein may be implemented by various means. For example, these techniques may be implemented in hardware, firmware, software, or a combination thereof. For a hardware implementation, the processing units at a transmitter may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. The processing units at a receiver may also be implemented within one or more ASICs, DSPs, processors, and so on.

For a software implementation, the transmission techniques may be implemented with instructions (e.g., procedures, functions, and so on) that perform the functions described herein. The instructions may be stored in a memory (e.g., memory 832 or 872 in FIG. 5) and executed by a processor (e.g., processor 830 or 870). The memory may be implemented within the processor or external to the processor.

It is noted that the concept of channels herein refers to information or transmission types that may be transmitted by the access point or access terminal. It does not require or utilize fixed or predetermined blocks of subcarriers, time periods, or other resources dedicated to such transmissions.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. A wireless communication device comprising:
a memory; and
a processor coupled with the memory, the processor configured to process a broadcast channel control message indicative of parameters of transmission parameters of at least one broadcast transmission to be received by the wireless communication device, wherein the processor is further configured to utilize information of the broadcast channel control message for processing the at least one broadcast transmission for one ultra-frame.

2. The wireless communication device of claim 1, wherein the ultra-frame comprises forty-eight super-frames.

3. The wireless communication device of claim 1, wherein the processor is configured to determine an error correction code used for the at least one broadcast transmission from the broadcast channel control message.

4. The wireless communication device of claim 1, wherein the processor is configured to determine a scrambling sequence used for the at least one broadcast transmission from the broadcast channel control message.

5. A method comprising:
processing a broadcast channel control message indicative of parameters of transmission parameters of at least one broadcast transmission to be received by a wireless communication device; and processing the at least one broadcast transmission according to the parameters, wherein the processing the at least one broadcast transmission comprises processing using the parameters for one ultra-frame.

6. The method of claim 5, wherein the ultra-frame comprises forty-eight superframes.

7. The method of claim 5, wherein processing comprises processing using an error correction code in the broadcast channel control message.

8. The method of claim 5, wherein processing comprises processing using a scrambling sequence in the broadcast channel control message.

9. An apparatus comprising:

means for processing a broadcast channel control message indicative of parameters of transmission parameters of at least one broadcast transmission to be received by a wireless communication device; and means for processing the at least one broadcast transmission according to the parameters, wherein the means for processing the at least one broadcast transmission comprises means for processing using the parameters for one ultra-frame.

10. A processor readable medium including instructions thereon that may be utilized by one or more processors, the instructions comprising:

instructions for processing a broadcast channel control message indicative of parameters of transmission parameters of at least one broadcast transmission to be received by a wireless communication device; and instructions for processing the at least one broadcast transmission according to the parameters, wherein the instructions for processing the at least one broadcast transmission comprise instructions for processing using the parameters for one ultra-frame.

* * * * *